April 16, 1940.  F. KONN  2,197,643
CONTROL SYSTEM
Filed Sept. 1, 1939
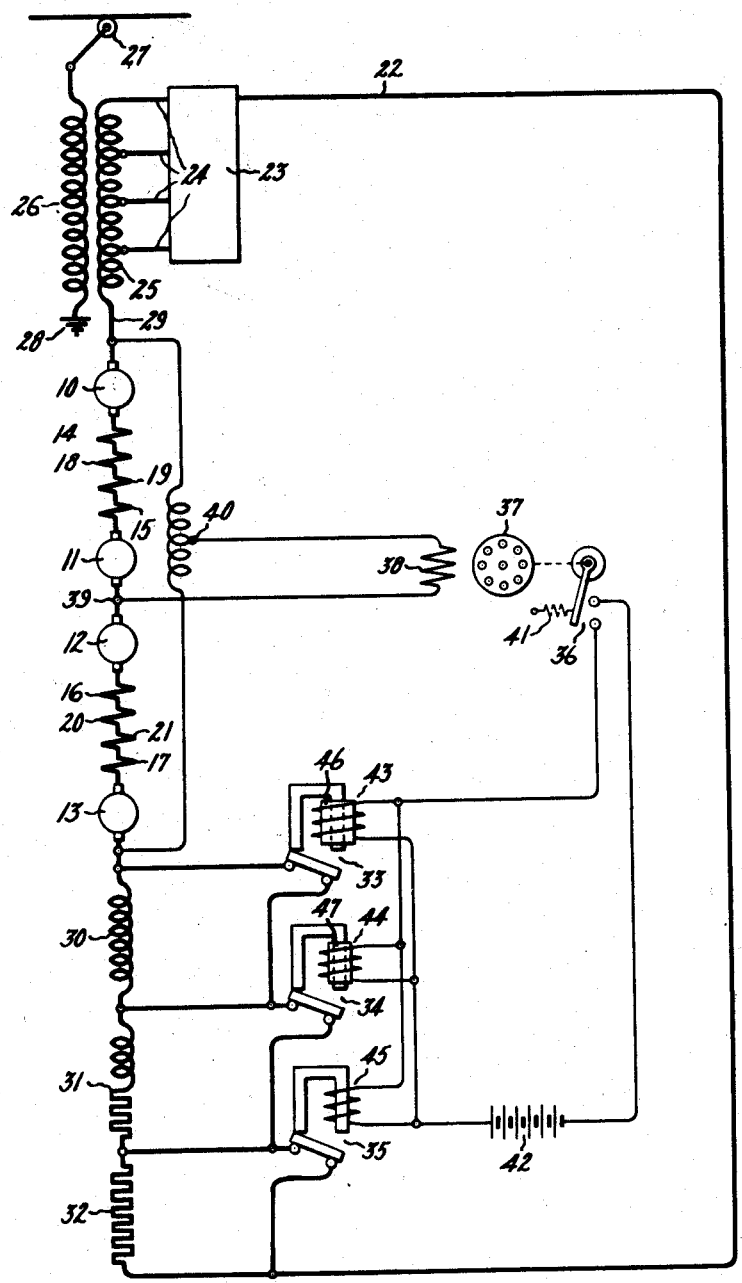
Inventor:
Felix Konn,
by Harry E. Dunham
His Attorney.

Patented Apr. 16, 1940

2,197,643

UNITED STATES PATENT OFFICE 2,197,643

CONTROL SYSTEM

Felix Konn, Erie, Pa., assignor to General Electric Company, a corporation of New York Application September 1, 1939, Serial No. 293,081

4 Claims. (Cl. 172—179)

My invention relates to control systems for electric motors, more particularly to systems for protecting a plurality of electric traction motors against wheel slippage, and has for its object a simple and reliable protective system of this type.

My invention has particular application to the control of the alternating current series motors of the commutating type used in the driving of electric vehicles, such as electric locomotives. It is customary to provide a plurality of motors separately connected to the various driving axles of the locomotives, these motors being electrically connected in series with each other. In the operation of these motors, one pair of wheels connected to an axle sometimes slips on the track, especially when rapid acceleration is attempted under heavy load conditions. When this slipping occurs, the motor or motors connected to the slipping axle accelerate to a higher speed than the other motors and may reach a speed causing damage to the motor on account of the resulting high mechanical stresses and flashovers at the commutator.

In accordance with my invention, I provide one or more current limiting impedances which are short-circuited during normal operation of the motors together with means responsive to a predetermined difference in the speeds of the motors for inserting these current limiting impedances in the circuit of the motors thereby to correct the wheel slipping conditions.

For a more complete understanding of my invention, reference should be had to the accompanying drawing, the single figure of which shows in diagrammatic form a system of motor control embodying my invention.

Referring to the drawing, I have shown my invention in one form as applied to an electric vehicle or traction motor drive system provided with four single-phase alternating current motors of the series field commutator type which are provided respectively with armatures 10, 11, 12, and 13, with commutating or interpole field windings 14, 15, 16, and 17, and with exciting field windings 18, 19, 20, and 21.

The motor armatures and field windings are connected in series relation with each other, as shown. Also the armatures may be conveniently mounted in pairs, to form as many twin armature motors as there are driving axles. Thus the armatures 10 and 11 drive through their respective pinions a common gear (not shown) which in turn drives one axle of the locomotive. In a similar manner, the armatures 12 and 13 are geared to drive another axle of the locomotive. It will be understood that additional pairs of twin motors may be used which are connected in series with each other and in parallel with the motors shown in the drawing. In fact, in certain large railway locomotives six twin armature motors are used, there being three motor circuits connected in parallel with each other and each circuit containing, as shown in the drawing, two twin armature motors connected in series with each other. For purposes of simplicity, only one of these three parallel motor circuits has been shown in the drawing.

One terminal of the motor circuit is connected through a conductor 22 to a controller 23 comprising suitable switching means for connecting this terminal to a selected one of a plurality of taps 24 on the secondary winding 25 of a supply transformer having its primary winding 26 connected to the trolley 27 and a ground connection 28. The other terminal of the motor circuit is connected through a conductor 29 directly to one terminal of the secondary winding 25. It will be understood that the controller 23 is suitably operated under the control of an operator to change the tap connections with the transformer secondary 25 so as to selectively vary the voltage applied to the motors and thereby control their speed as desired.

For the purpose of correcting a wheel slipping condition should it occur, I have provided three suitable impedances 30, 31, and 32 for connection in the motor circuit momentarily while this condition prevails.

These impedances are normally short-circuited, as shown, by electromagnetically operated switches 33, 34, and 35 which switches are opened automatically by a relay 36 in response to a predetermined speed difference, which is an indication of wheel slippage, between the armatures 10, 11 and the armatures 12, 13.

For the purpose of assuring a voltage drop across the impedance to assure correction of the slippage condition, I have provided both reactance and resistance, the impedance 30 consisting entirely of reactance, the impedance 31 consisting of both reactance and resistance and the impedance 32 consisting entirely of resistance. It will be understood that at low motor speeds, the power factor is low and a reactance is required to give the desired reduction in motor current, while at high motor speeds the power factor is high and a resistance is required to limit the motor current.

The relay 36 is substantially of the form described and claimed in U. S. Patent 2,006,173 to Jacob W. McNairy and Harold S. Ogden, issued June 25, 1935. The operating element consists of a single-phase shaded pole induction motor having a squirrel cage rotor 37 and an operating winding 38. This winding has one terminal connected to a point 39 between the two pairs of armatures while its other terminal is connected to the mid-point of an auto-transformer or reactance coil 40. The terminals of this coil 40 are connected across the motor armature and field circuit so as to be in parallel with them.

In the operation of the relay 36, as long as the armatures 10, 11 are operating at the same speed as the armatures 12, 13 so that the voltages across the two pairs are equal to each other, the mid-point of the coil 40 will be at the same electrical potential as the mid-point 39 in the motor circuit and, consequently, no voltage will be impressed on the winding 38. In the event of excessive speed of one pair of the armatures, the voltage across that pair increases with decrease in the voltage across the other pair of armatures and, as a result, a voltage is impressed on the coil 40. This voltage is proportional to the difference between the speeds of the motors. When this speed difference reaches a predetermined value for which the relay is adjusted, as by a spring 41, the rotor 37 turns and closes the relay. This closes a circuit from a suitable auxiliary source of direct current, shown as a battery 42, for the coils 43, 44 and 45 of the switches 33, 34, and 35. The switches are thereupon picked up to their open positions and the impedances inserted in the motor circuit.

The impedances are of such value as to reduce the motor current to such an extent as to terminate the wheel slippage. It will be noted that this is done automatically independently of the motorman. The action is much faster than could be obtained by the motorman's notching his controller back. Another advantage is that the controller does not need to be notched or turned back and therefore the driving effort applied by the other motors on the locomotives is not reduced. Thereby is avoided any unnecessarily large reduction in the locomotive tractive effort.

The impedances are inserted in the motor circuit for a few seconds at the most. Consequently, their heating capacity is only a secondary consideration and they can be built so as to concentrate considerable impedance in small physical dimensions.

When the difference in the speeds of the motors is reduced to a predetermined minimum, the relay 36 is opened by the spring 41 and the switches 33, 34, and 35 again close and short-circuit the impedances. In order to make the reapplication of power to the motors more gradual, one or more switches are provided with suitable timing means so as to provide a predetermined sequential closing of the switches. As shown, the switches 33 and 34 are provided on their magnet cores with copper cylinders or jackets 46 and 47 which form single turn secondary circuits for the flux in the respective core. By reason of their inductive effects, these copper jackets delay the drop-out and closing of these switches. The jacket 46 is preferably made of thicker material than the jacket 47 so as to give a more pronounced inductive damping and time delay effect. Thus the switch 35 closes almost immediately after the opening of the relay 36. It is followed by the switch 34 in perhaps a period of several seconds and the switch 34 is followed by the switch 33 after a similar period. Because of the large air gap in the magnetic circuit when the switches are open the copper jackets do not increase appreciably the pick-up times of the switches 33 and 34. Obviously other types of time delay devices could be used.

Although not shown in the drawing, it will be understood that suitable reversing switches will be provided for the reversing operation of the motors.

While I have shown a particular embodiment of my invention, it will be understood, of course, that I do not wish to be limited thereto, since many modifications may be made and I, therefore, contemplate by the appended claims to cover any such modifications as fall within the true spirit and scope of my invention.

What I claim as new and desire to secure by Letters Patent of the United States, is:

1. The combination with a plurality of motors connected in series circuit relation with each other, of an impedance connected in series with said motors, normally closed switches respectively short-circuiting said impedance, means differentially responsive to the speeds of said motors for opening said switches to insert said impedance in circuit with said motors when the difference in the speed of said motors reaches a predetermined value and for closing said switches when said speed difference decreases to a predetermined value, and timing means associated with at least one of said switches for causing said switches to close in sequence.

2. In combination with a plurality of motors connected in series circuit relation with each other, of a reactance and a resistance connected in series with each other and in series with said motors, normally closed switches respectively short-circuiting said reactance and said resistance, means differentially responsive to the speeds of said motors for opening said switches to insert said reactance and said resistance in circuit with said motors when the difference between the speeds of said motors reaches a predetermined value and for closing said switches when said speed difference decreases to a predetermined value, and timing means associated with at least one of said switches for causing said switches to close in sequence.

3. In a driving system for an electric vehicle provided with a plurality of driving wheels, the combination with a plurality of series connected alternating current motors connected respectively to drive said driving wheels, means for supplying selected alternating current voltages to said motors for starting and running operation of said motors, an impedance connected in series with said motors, normally closed switching means for normally short circuiting said impedance during the starting and running of said motors, and means differentially responsive to the speeds of said motors for opening said switching means to insert said impedance in circuit with said motors when the difference in the speeds of said motors reaches a predetermined value.

4. In a driving system for an electric vehicle provided with a plurality of driving wheels, the combination with a plurality of series connected alternating current motors connected respectively to drive said driving wheels, means for supplying selected alternating current voltages to said motors for starting and running operation of said motors, an impedance consisting of series connected resistance and reactance connected in series with said motors, a plurality of normally closed switches for normally short circuiting said impedance during the starting and running of said motors, means differentially responsive to the speeds of said motors for opening said switching means to insert said impedance in circuit with said motors when the difference in the speeds of said motors reaches a predetermined value and for closing said switches when said speed difference decreases to a predetermined value, and timing means associated with at least one of said switches for causing said switches to close in sequence.

FELIX KONN.